United States Patent
Bellegarda et al.

(10) Patent No.: US 6,285,785 B1
(45) Date of Patent: Sep. 4, 2001

(54) MESSAGE RECOGNITION EMPLOYING INTEGRATED SPEECH AND HANDWRITING INFORMATION

(75) Inventors: Jerome Rene Bellegarda, Goldens Bridge; Dimitri Kanevsky, Ossining, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/073,091

(22) Filed: Jun. 7, 1993

Related U.S. Application Data

(63) Continuation of application No. 07/856,803, filed on Mar. 24, 1992, which is a continuation of application No. 07/676,601, filed on Mar. 28, 1991.

(51) Int. Cl.[7] .................................................. G06K 9/00

(52) U.S. Cl. ............................................................ 382/187

(58) Field of Search ................................ 382/1, 2, 3, 13, 382/14, 15, 30, 34, 37, 39, 48; 340/825.3, 825.31, 825.34; 381/41, 43; G06K 9/00, 9/62, 9/68, 9/70, 9/74, 9/20; G06F 7/04, 7/00; G10L 5/00, 7/00, 9/00, 5/06, 7/08, 9/06

(56) References Cited

U.S. PATENT DOCUMENTS

| | | | |
|---|---|---|---|
| 3,969,700 | 7/1976 | Bollinger et al. | 382/30 |
| 4,024,500 | 5/1977 | Herbst et al. | 382/13 |
| 4,651,289 | 3/1987 | Maeda et al. | 382/15 |
| 4,727,588 | 2/1988 | Fox et al. | 382/13 |
| 4,731,857 | 3/1988 | Tappert | 382/9 |
| 4,736,447 | 4/1988 | Korsinsky | 382/69 |
| 4,754,489 | 6/1988 | Bokser | 382/40 |
| 4,774,677 | 9/1988 | Buckley | 382/15 |
| 4,805,225 | 2/1989 | Clark | 382/15 |
| 4,857,912 | 8/1989 | Everett, Jr. et al. | 340/825.3 |
| 4,907,274 | 3/1990 | Nomura et al. | 380/30 |
| 4,993,068 | 2/1991 | Piosenka et al. | 340/825.34 |

FOREIGN PATENT DOCUMENTS

| | | | |
|---|---|---|---|
| 0355748A2 | 2/1990 | (EP) | G06K/9/62 |
| 2178578A | 2/1987 | (GB) . | |
| WO 92/05517 | 4/1992 | (WO) | G06K/9/22 |

OTHER PUBLICATIONS

"Handwriting/Speech Signal Analyzer" IBM Technical Disclosure Bulletin, vol. 22, No. 5 Dec. 1989, J. Gould et al.

(List continued on next page.)

Primary Examiner—Jose L. Couso
(74) Attorney, Agent, or Firm—Paul J. Otterstedt; Perman & Green, LLP

(57) ABSTRACT

A method of, and apparatus for, operating an automatic message recognition system. In accordance with the method the following steps are executed: a user's speech is converted to a first signal; a user's handwriting is converted to a second signal; and the first signal and the second signal are processed to decode a consistent message, conveyed separately by the first signal and by the second signal, or conveyed jointly by the first signal and the second signal. The step of processing includes the steps of converting the first signal into a plurality of first multi-dimensional vectors and converting the second signal into a plurality of second multi-dimensional vectors. For a system employing a combined use of speech and handwriting the step of processing includes a further step of combining individual ones of the plurality of first multi-dimensional vectors and individual ones of the plurality of second multi-dimensional vectors to form a plurality of third multi-dimensional vectors. The multi-dimensional vectors are employed to train a single set of word models, for joint use of speech and handwriting, or two sets of word models, for sequentially employed or merged speech and handwriting.

46 Claims, 4 Drawing Sheets

OTHER PUBLICATIONS

"Experiments on Neural Net Recognition of Spoken and Written Text" IEEE Transactions on Acoustics, Speech, and Signal Processing, vol. 36, No. 7 Jul. 1988 D. Burr.

"Automatic Lipreading to Enhance Speech Recogniton" CH2145–1, IEEE 1985., D. Petajan.

"On the Aggregation of Individual Probability Estimates" Management Science, vol. 27, No. 8, Aug. 1981, R. Bordley et al.

"Consensus and Evidence" Pattern Recognition Practice II, 1986, pp. 523–546, C. Berenstein et al.

"Flexible, Space–Time Segmenter for Handwritten Words" IBM Technical Disclosure Bulletin, vol. 29, No. 11, Apr. 1987, A. S. Fox et al.

"Handwriting Recognition by SUbstroke Segmentation and Composition" IBM Technical Discl. Bulletin, vol. 27, No. 9, Feb. 1985, J. Kurtzberg et al.

"Segmentation Procedure for Handwritten Symbols and Words" IBM Technical Discl. Bulletin vol. 25, No. 7B, Dec. 1982, J. Kurtzberg et al.

"Combining Probability Distributions from Dependent Information Sources" Management Science, vol. 27, No. 4, Apr. 1981, R. Winkler.

"Adaptive On–Line Handwriting Recognition", IEEE Seventh International Conference on Pattern Recognition Proceedings, Jul. 30–Aug. 12, 1984, by C. C. Tappert.

"Application of an Auditory Model to Speech Recognition", J. Acoust, Soc. Am. 85(6) Jun. 1989, J. Cohen.

"Speech Recognition Using Noise–Adaptive Prototypes" A. Nadas, reprinted from IEEE Transactions on Acoustics, Speech and Signal Processing vol. 37, No. 10, 1989.

"Neural Models of Cursive Script Handwriting", P. Morasso, Proc. 1989 International Joint Conf. on Neural Networks, vol. II, pp. 539–542, Jun. 1989.

"Design of a Neural Network Character Recognizer for a Touch Terminal" Pattern Recognition, vol. 24, 1991, in press.

"A Handwriting Recognition System Based on the Properties and Architectures of the Human Motor System" L. Schomaker et al.

"Adaptive Labeling: Normalization of Speech by Adaptive Transformations Based on Vector Quantization", A. Nadas, et al. Proc. 1988 Int. Conf. on Acou. Speech, Signal Proc.

"Phoneme Recognition Using Time–Delay Neural Networks", A. Waibel et al. IEEE Trans. on Acoustics, Speech and Signal Processing, vol. 37. No. 3, Mar. 1989.

"Differential Competitive Learning for Centroid Estimation and Phoneme Recognition", S. Kong et al. IEEE Transactions on Neural Networks, vol. 2, No. 1, Jan. 1991.

Patent Abstract of Japan, vol. 7, No. 249 (P–234) Nov. 5, 1983 & JP, A, 58 134 371 (Nippon Denki K.K.) Aug. 10, 1983.

Patent Abstract of Japan, vol. 10, No. 45 (P–430) Feb. 21, 1986 & JP, A, 60 189 070 (Fujitsu K.K. ) Sep. 26, 1985.

Patent Abstract of Japan, vol. 11, No. 87 (P–557) Mar. 17, 1987 & JP,A, 61 240 361 (Hitachi Electronics Eng. Co. Ltd.) Oct. 25, 1986.

Patent Abstract of Japan, vol. 7, No. 146 (P–206) Jun. 25, 1983 & JP,A,58 058 637 (Nippon Denki K.K.) Apr. 7, 1983.

Patent Abstract of Japan, vol. 6, No. 137 (P–130) Jul. 24, 1982, & JP, A, 57 059 241 (Sasaki Nobuhiko) Apr. 1982.

MESSAGE RECOGNITION EMPLOYING INTEGRATED SPEECH AND HANDWRITING INFORMATION

This application is a continuation of copending application Ser. No. 07/856,803 filed on Mar. 24, 1992, which is a continuation of copending application Ser. No. 07/676,601.

FIELD OF THE INVENTION

This invention relates generally to message recognition method and apparatus and, in particular, to improved message recognition method and apparatus that integrates handwriting recognition and speech recognition.

BACKGROUND OF THE INVENTION

Due to the difficulties inherent in the analysis of complex processes such as speech and handwriting, the machine recognition of these two methods of communication has thus far met with limited success.

The separate development of speech and handwriting recognition methodology has resulted in two alternative means to improve the effectiveness of a man-machine interface, particularly in the context of workstations and personal computers. These separately developed approaches both attempt to utilize natural ways of communicating, specifically voice and handwriting, in order to establish an unconstrained dialogue with a computer.

One rational for developing Automatic Speech Recognition (ASR) is to provide a dictation machine capable of reducing or eliminating the need for a keyboard. More generally, ASR can be defined as any system that uses as input a set of patterns produced by a speaker. ASR may also be extended to include systems that recognize speech based on the measurement of acoustic vibrations in the throat and chest, as well as systems which recognize the movements of lips, jaws, etc. In this regard reference is made to an article entitled "Automatic Lipreading to Enhance Speech Recognition", CH2145-1, pps. 40–47, IEEE (1985), by E. D. Petajan.

Similarly, one rational for developing Automatic Handwriting Recognition (AHR) has also been directed towards reducing or eliminating the requirement for the conventional computer keyboard. Traditionally, AHR recognizes handwritten characters captured in real time on an electronic tablet.

By example, in human factor studies there are often conducted large numbers of psychological experiments to measure a user's reaction to some parameters of interest. The majority of such experiments involve many participants, each of whom must register their responses for later analysis. This analysis is usually accomplished automatically through special-purpose software. It is of paramount importance that the subject's reaction to the measured parameters be isolated as completely as possible from their reaction to the logistics of the experiments. In particular, experiments involving moderately unnatural interfaces, such as a keyboard, may conceivably distract the attention of the subject away from the essence of the experiments. Also, the modus operandi for some experiments may not leave the subject sufficient time to type a response.

In this situation, the only reasonable alternatives are to dictate the responses into a tape recorder or to write them by hand on an answer sheet. Unfortunately, the use of such natural interfaces tends to complicate the interpretation of the experiments. Converting the subject's responses into a form suitable for automatic analysis requires subsequent effort by clerical personnel or by the participants themselves. All dictated/handwritten material must be carefully typed and then thoroughly reviewed for typing errors, lest the results be biased in some unpredictable way. The required strenuous proof-reading requires a substantial amount of time and causes large delays in interpreting experiments.

One method to avoid these delays without sacrificing the naturalness of the interface is to have the participants directly produce soft copies of their responses, either by dictating into an ASR or by providing handwriting to an AHR. Both of these approaches, however, suffer from the deficiencies enumerated below.

One disadvantage inherent in conventional ASR and AHR techniques is that an acceptable recognition rate is often achieved only in a user-dependent mode with isolated (word or character) inputs. Operating in this way results in several undesirable constraints, including: (a) a user must train the system before being able to use it; and (b) a user must interact with the system in a slightly unnatural way, either by speaking with pauses between words or by writing with spaces between letters.

Another disadvantage inherent in conventional ASR and AHR techniques is that 100% recognition accuracy is extremely difficult to achieve, due to an inability of a human to be perfectly consistent over time in the manner in which he or she speaks or writes.

This disadvantage also imposes several constraints including: (a) a user must identify any errors that may be introduced during decoding, which tends to distract the user's attention away from the subject of the message; and (b) a user must correct wrongly decoded words or characters which, as a matter of practicality, requires the use of an alternative technology, such as a keyboard.

The following U.S. Patents are cited as being of interest to the teaching of the invention.

Commonly assigned U.S. Pat. No. 3,969,700, issued Jul. 13, 1976, entitled "Regional Context Maximum Likelihood Error Correction for OCR, Keyboard, and the Like", to Bollinger et al., describes a general error correction scheme, applicable to pattern recognition problems, that use segmentation prior to recognition, including optical character recognition (OCR) and ASR. No specific mention is made of on-line AHR and there is no disclosure of employing both ASR and AHR in a message recognition system.

U.S. Pat. No. 4,651,289, issued Mar. 17, 1987, entitled "Pattern Recognition Apparatus and Method for Making Same", to Maeda et al., describes an algorithm whose primary goal is to introduce robustness in a template matching procedure, such as is used in ASR and AHR. To this end there are employed multiple templates per pattern to be recognized, rather than a single template. Scores from multiple matches are appropriately combined to arrive at a final decision. There is no disclosure of applying this method simultaneously to speech and handwriting.

U.S. Pat. No. 4,736,447, issued Apr. 5, 1988, entitled "Video Computer", to Korsinsky describes a multi-facet interface which is said to acquire a variety of data, including speech and handwriting. The basic recognition algorithm utilized is template matching. No attempt is made to integrate the diverse sources of information, either for recognition purposes or otherwise. Also, there is no mention of error-correction.

U.S. Pat. No. 4,774,677, issued Sep. 27, 1988, entitled "Self-Organizing Circuits", to Buckley, describes a class of algorithms and architectures pertinent to the general field of pattern recognition. However, as in the previous references, the issue of the integration of ASR and AHR is not addressed.

U.S. Pat. No. 4,907,274, issued Mar. 6, 1990, entitled "Intelligent Work Station", to Nomura et al., describes a telephone interface incorporating speech recognition and synthesis. The application involves image compression as well, but there is no discussion of AHR or OCR.

Other art of interest includes the following.

European Patent Application 0 355 748 describes a fast classification algorithm which is intended to be used in conjunction with a hierarchical approach to pattern recognition. The domain of applications appears to be OCR. There is no explicit mention of speech or of an integration of ASR and AHR.

IBM Technical Disclosure Bulletin Vol. 22, No. 5, October 1979, entitled "Handwriting/Speech Signal Analyzer" by J. Gould et al. describes an analyzer to discriminate between pause times and production times in on-line AHR or ASR.

An article entitled "Experiments on Neural Net Recognition of Spoken and Written Text" IEEE Transaction on Acoustics, Speech and Signal Processing, Vol. 36, No. 7, July 1988 by D. Burr compares two different classes of algorithms for use in pattern recognition problems such as AHR and ASR. The combined use of speech and handwriting is not considered, and error correction is not addressed.

It is thus one object of the invention to provide a message recognition system that employs a functional complementarity of speech and handwriting inputs.

It is another object of the invention to provide method and apparatus for sequentially using a handwriting or a speech input in an error correcting technique for the other.

It is another object of the invention to provide method and apparatus that integrates AHR and ASR in a message recognition system to exploit the complementarity of speech and handwriting inputs as simultaneous sources of information.

It is another object of the invention to provide method and apparatus that integrates AHR and ASR in a message recognition system to achieve a combined use of speech and handwriting recognition that significantly improves the overall accuracy of an automatic message recognizer.

It is one further object of the invention to provide method and apparatus that integrates AHR and ASR in a message recognition system in (a) a sequential manner to achieve error correction, (b) in a simultaneous manner using separate ASR and AHR components, and (c) in an simultaneous manner using a single ASR/AHR component.

SUMMARY OF THE INVENTION

The foregoing and other problems are overcome and the objects of the invention are realized by method and apparatus that employs an integrated use of speech and handwriting recognition to improve an overall accuracy, in terms of throughput, of an automatic recognizer. The invention exploits a complementarity of acoustic and stroke information to provide method and apparatus having improved message recognition accuracy relative to either speech recognition or handwriting recognition alone.

In accordance with a method of the invention, and apparatus for carrying out the method, of operating an automatic message recognition system, the following steps are executed: a user's speech is converted to a first signal; a user's handwriting is converted to a second signal; and the first signal and the second signal are processed to decode a consistent message conveyed separately by the first signal and by the second signal or conveyed jointly by the first signal and the second signal.

The step of processing includes the steps of converting the first signal into a plurality of first multi-dimensional vectors and converting the second signal into a plurality of second multi-dimensional vectors. For a system employing a single (combined) speech and handwriting component the step of processing includes a further step of combining individual ones of the plurality of first multi-dimensional vectors and individual ones of the plurality of second multi-dimensional vectors to form a plurality of third multi-dimensional vectors.

The multi-dimensional vectors are employed to train the parameters of a set of combined word models, for a combined use of speech and handwriting, or to train two sets of word models, for separate use during speech and handwriting recognition. During use, the probabilities, or likelihoods, of each input feature vector are computed using the appropriate set(s) of word models to generate a list or lists of candidate words. A candidate word is selected as representing a message based upon criteria including the probability score and, for the separate-use message recognition system, two weighting factors derived during training of the models.

The integrated use of ASR and AHR has been found to be advantageous for several reasons. Firstly, there exists complementarity in information. That is, information gathered through speaking and information gathered through handwriting complement one another. Secondly, there is provided complementarity in performance. That is, the manner in which speech and handwriting recognition algorithms operate complement one other. Thirdly, there is provided complementarity in functionality. That is, those functions most readily implemented using ASR and AHR complement each other. For example, AHR exhibits editing capabilities which are more difficult to implement using ASR while some functions, such as generating a large body of text, can be implemented more efficiently through a speech input.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
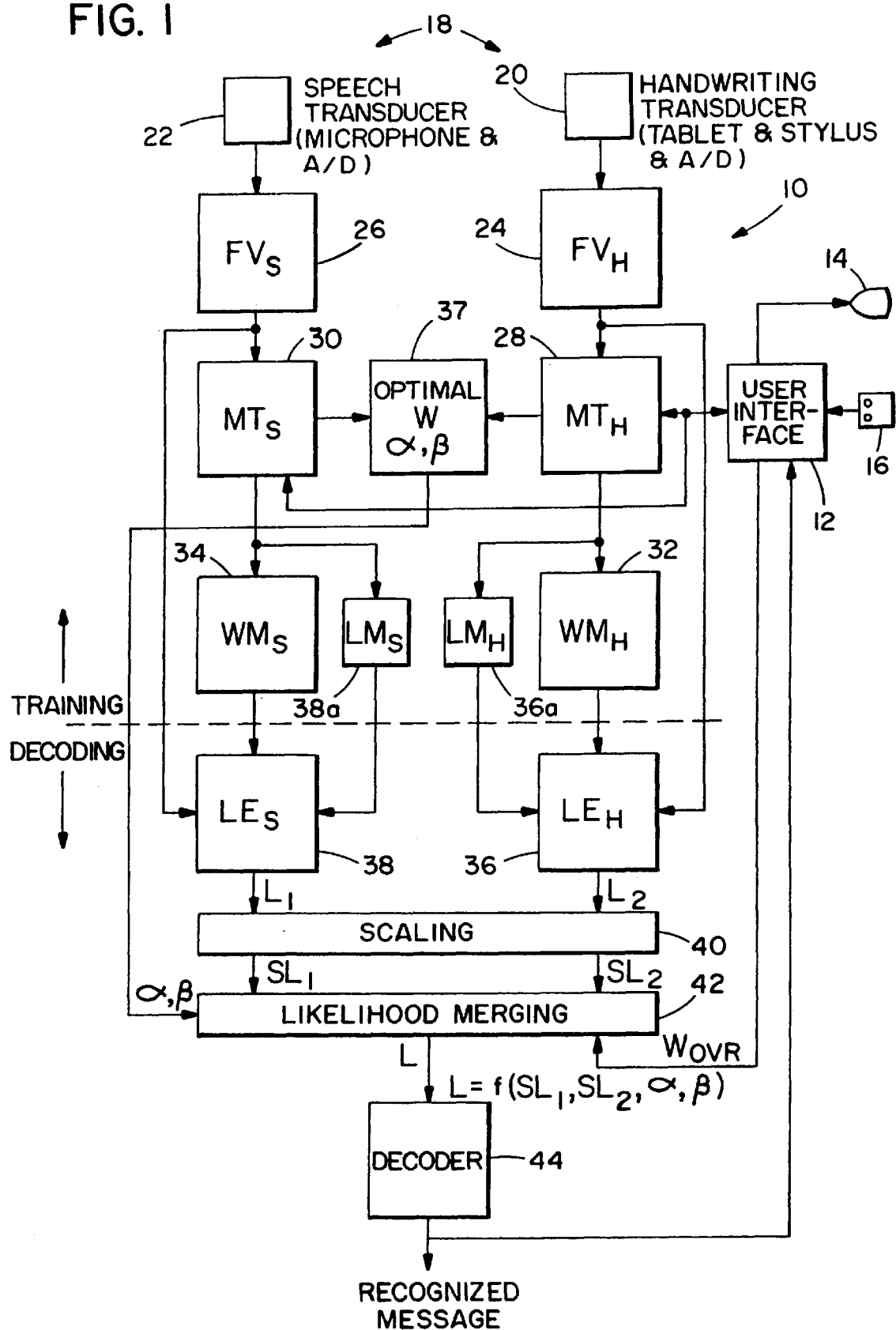
FIG. 1 is a block diagram of a message recognition system that is constructed and operated in accordance with a first embodiment of the invention to include a separate use of speech and handwriting information.

Referring to FIG. 1 there is illustrated in block diagram form a message recognition system 10 constructed and operated in accordance with a first embodiment of the invention. As employed herein a message is considered to be information generated by a human subject and entered into the system 10, the information being entered through an acoustic signal, a handwritten stroke signal, or through a combination of acoustic and stroke signals. The information may represent individual characters, including numbers, letters of the alphabet, punctuation and the like. The information may also represent words, phrases, and paragraphs.

System 10 includes a user interface 12 coupled to a display terminal 14 for displaying information to a user of the system 10. A pointing device 16, such as a mouse and/or a keyboard, may be provided for inputting additional information to the processor 12. In this regard it is noted that for an application employing the method and apparatus of the invention the primary in-flow of information is preferably via a combination of speech and handwriting inputs, and not through the pointing device if one is provided.

In accordance with the invention the system 10 includes an Integrated Speech and Writing Interface (ISWI) 18. This dual input user interface is comprised of a handwriting transducer 20, typically an electronic tablet and stylus, and a speech transducer 22, typically embodied as a microphone coupled to an analog to digital converter.

It is noted that the handwriting transducer may be embodied in any means suitable for detecting a motion of a writing implement during use by a human subject. Also, the speech transducer 22 may include any means suitable for generating a set of patterns expressive of speech. By example, the above mentioned article entitled "Automatic Lipreading to Enhance Speech Recognition", CH2145-1, pps. 40–47, IEEE (1985), by E. D. Petajan, discusses a solid state camera that images a subject's lips and nostrils during speech. The author states that a combination of acoustic and visual recognition candidates yields a final speech recognition accuracy which greatly exceeds acoustic recognition accuracy alone.

Figure 3:
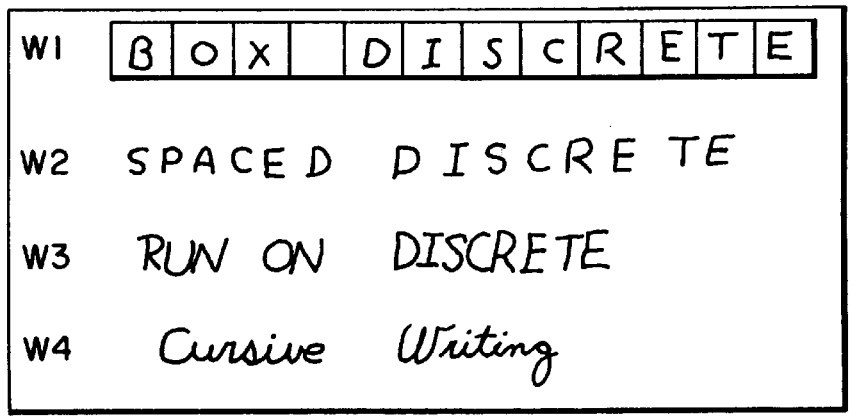
FIG. 3 provides examples of four different types of handwriting that may be input to the system.

Handwritten characters generally fall into the four groups depicted in FIG. 3, the groups being depicted in increasing order of recognition complexity. Specifically, these groups include a first type of writing (W1) known as box discrete wherein individual characters are formed within predefined areas, or boxes, thereby simplifying the task of character segmentation. A second type of writing (W2) is known as spaced discrete wherein the user intentionally forms each character such that no character touches another. A third type of writing (W3) is known as run-on discrete wherein the user is not constrained and may form characters that touch, or "run-on" to, one another. A fourth type of writing (W4) is cursive writing which presents the most complex segmentation task of the four styles depicted in FIG. 3.

In regard to stroke segmentation and identification, reference is made to the following commonly assigned U.S. Patents as providing examples of various methods of handwritten character recognition: U.S. Pat. No. 4,024,500, issued May 17, 1977, entitled "Segmentation Mechanism for Cursive Script Character Recognition Systems" (N. M. Herbst and J. H. Morrissey); U.S. Pat. No. 4,727,588, issued Feb. 23, 1988, entitled "System for Automatic Adjustment and Editing of Handwritten Text Image" (A. S. Fox, E. C. Greanias, J. Kim, and C. C. Tappert); and U.S. Pat. No. 4,731,857, issued Mar. 15, 1988, entitled "Recognition System for Run-on Handwritten Characters" (C. C. Tappert).

Reference is also made, by example, to the teaching of IBM Technical Disclosure Bulletin, Vol. 27, No. 9, 1985, "Handwriting Recognition by Substroke Segmentation and Composition" (J. M. Kurtzberg and C. C. Tappert) for showing a technique for recognizing cursive script that is handwritten upon an electronic tablet. Reference is also made to an article entitled "Segmentation Procedure for Handwritten Symbols and Words" IBM Technical Disclosure Bulletin, Vol. 25, No. 7B, December 1982 by J. M. Kurtzberg and C. C. Tappert, and to an article entitled "Flexible, Space-Time Segmenter for Handwritten Words" IBM Technical Disclosure Bulletin, Vol. 29, No. 11, April 1987 by A. S. Fox, J. Kim and C. C. Tappert.

Figure 4A:
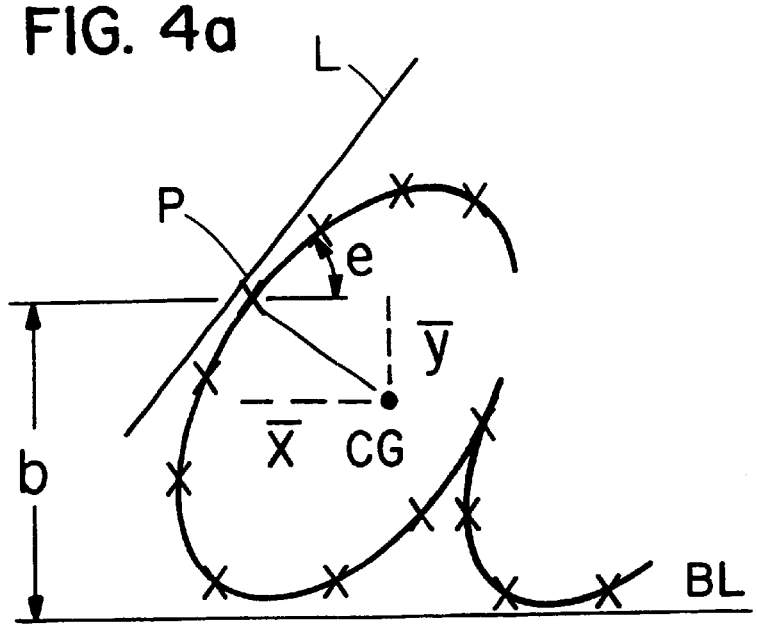
FIG. 4a illustrates a handwritten character being processed to generate a feature vector for a point (P)
Figure 4B:
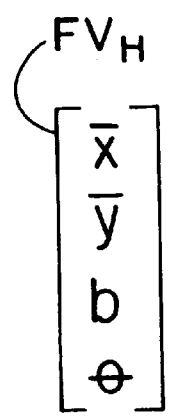
FIG. 4b illustrates a four-dimensional handwriting feature vector generated for the point (P) by collecting a plurality of spatial attributes.

With the use of a conventional electronic tablet for the handwriting transducer 20 data is typically acquired at 70 points per second. The sampled handwriting is applied to an associated handwriting feature vector ($FV_H$) processor 24. As employed herein a feature vector is a set of characteristics of the input accumulated during a specific time interval. Processor 24 generates one or more handwriting feature vectors for each input stroke. This is preferably accomplished, as indicated in FIGS. 4a and 4b, in reference to a center of gravity (CG) of a stroke. The input stroke, by example a lower-case "a", is captured by the electronic tablet. Each feature vector includes elements expressive of an x and a y displacement of a sample point (P) on the stroke, relative to the center of gravity, a displacement (b) of P relative to a baseline (BL), and angular information (theta) relating to a line (L) tangent to P. The resulting feature vector, for this presently preferred embodiment, has four elements and thus represents a four dimensional (4-d) vector.

With the use of a microphone and A/D converter as the speech transducer 22 the speech is typically sampled at a 20 kHz rate and is Fast Fourier transformed. The amplitude (a) within 20 frequency bands is determined as ($a_1, \ldots a_{20}$) for each speech sample.

The following articles are cited as teaching aspects of speech sampling and transformation that are suitable for use by the system 10: J. R. Cohen, "Application of an Auditory Model to Speech Recognition", J. Acoustic. Soc. of America, Vol. 85, No. 6, pp. 2623–2629, June 1989; A. Nadas, D. Nahamoo, and M. A. Picheny, "Speech Recognition Using Noise-Adaptive Prototypes", IEEE Trans. Acoustics, Speech, Signal Processing, Vol. 37 No. 10, pp. 1495–1503, October 1989; and "Adaptive Labelling: Normalization of Speech by Adaptive Transformations Based on Vector Quantization", in Proc. 1988 Int. Conf. on Acoustics, Speech, Signal Processing, New York, N.Y. pp. 40–43, April 1988.

Figure 4C:
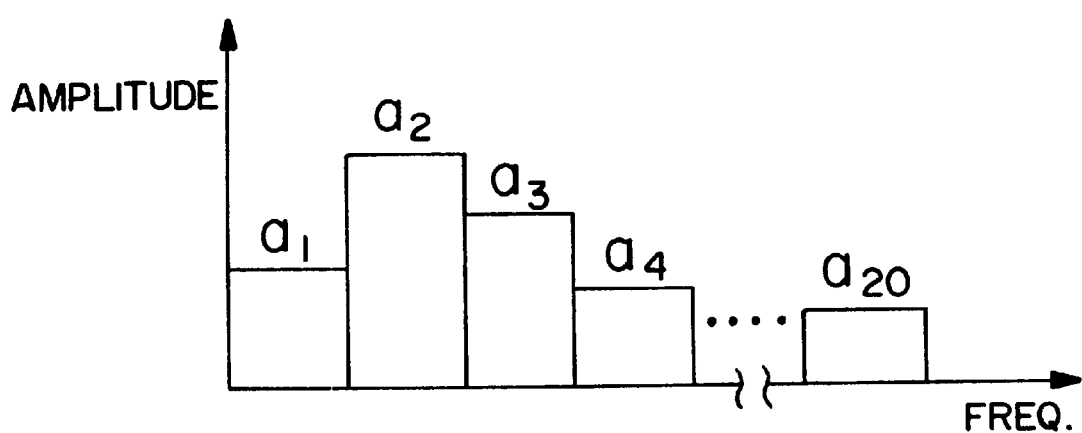
FIG. 4c illustrates, in the frequency domain, a speech sample being processed to obtain a feature vector therefrom, specifically, the determination of amplitudes associated with a plurality of frequency bands, not necessarily all of equal bandwidths.
Figure 4D:
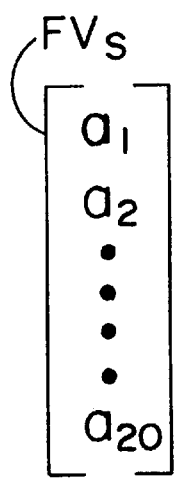
FIG. 4d illustrates a twenty-dimensional speech feature vector generated from the speech sample.
Figure 4E:
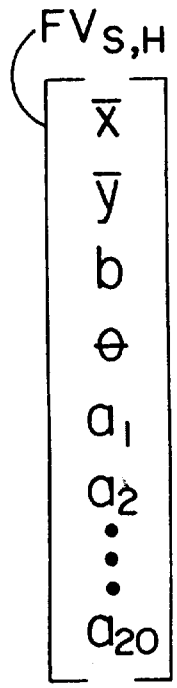
FIG. 4e illustrates one embodiment of a combined speech and handwriting feature vector, specifically, a concatenation of the handwriting feature vector of FIG. 4b and the speech feature vector of FIG. 4d.

FIG. 4c illustrates a speech sample being processed to obtain a speech feature vector ($FV_S$) therefrom. The determination of amplitudes associated with the plurality of frequence bands yields a twenty dimensional (20-d) frequency domain feature vector shown in FIG. 4d. The output of the speech transducer 22 is applied to an associated $FV_S$ processor 26 that generates the series of 20-d speech feature vectors, wherein each element of the vector is expressive of an amplitude within one of the 20 sampling bands.

During training of the system 10 the feature vectors are each applied to an associated word model training processor. Specifically, the handwriting feature vectors are applied to a handwriting model trainer ($MT_H$) processor 28 and the speech vectors are applied to a speech model trainer ($MT_S$) processor 30. Each of the model trainer processors is coupled to the user interface 12 for interacting with a user during training. This interaction may involve the entry of training sets of sentences by the user and the display of training results. Each model trainer processor functions to determine a set of optimal parameters for an associated model, specifically a handwriting word model ($WM_H$) 32 and a speech word model ($WM_S$) 34. In addition, a function of each of the training processors 28 and 30 is to determine optimal weights (W) 37, represented as $\alpha$ and $\beta$, that govern the relative contribution of speech and handwriting to the final message recognition. For example, if during training on a specific set of training data speech is found to provide a higher likelihood, or score, than handwriting, the weight associated with the speech likelihood is increased and the weight associated with the handwriting likelihood is decreased. If the two likelihood scores are found to be comparable the weights are set to be the same, i.e. 0.5. The use of the weights is described in greater detail below.

In a presently preferred embodiment of the invention the speech trainer 30 operates in accordance with a hidden Markov model technique to identify phonemes and individual words. By example, for English speech there are four general classes of phonemes: nasals, stops, vowels and fricatives. The training and use of Markov models for speech recognition is disclosed in a journal article entitled "A Maximum Likelihood Approach to Continuous Speech Recognition", IEEE Transactions on Pattern Analysis and Machine Intelligence, Vol. PAMI-5, No. 2, March 1983 pp. 179–190 by L. Bahl et al. The technique described in this article is one suitable technique for implementing the speech language model and model trainer. In general, a hidden Markov model or source is comprised of a collection of states connected to one another by transitions which produce symbols from a finite alphabet. For training, one state is chosen as an initial state and another state is chosen as a final state. A training algorithm assigns probabilities to all strings of transitions from the initial state to the final state, as well as all outputs generated in the process.

The role of the Markov word model for speech is to represent the pronunciation of a word. The parameters of the Markov model are trained by relating the acoustic signal produced by the speaker to the word uttered. It should be noted that whereas there is one Markov word model per word in the vocabulary, there is only one language model per vocabulary. In the case of a 3-gram language model, the probabilities are collected for all 3-uples of words that appear in a large body of text written in the language considered. Thus, and by example, the probability of the 3-uple "the phone rings" is significantly higher than the probability of the 3-uple "the phone drinks". It should be noted that this difference in probabilities is independent of the corresponding acoustic signals. Therefore, a language model may be determined once for a given language, whereas Markov word models improve as they are trained on a speaker-by-speaker basis. By the same token, the same language model could also be used for AHR. However, for AHR a simple dictionary look-up is preferred since it can be accomplished readily by inspection.

The handwriting model trainer 28 preferably operates in accordance with an elastic stroke matching technique disclosed by C. C. Tappert in an article entitled "Adaptive On-Line Handwriting Recognition", IEEE International Conference on Pattern Recognition Proceedings, (1984). As employed herein elastic matching clusters elastically deformed input strokes, as represented by their associated stroke vectors, into stroke templates to form character prototypes.

Coupled to the output of each of the models 32 and 34 is a Likelihood Estimator (LE), specifically, a handwriting LE 36 and a speech LE 38. The general purpose of each of the LEs, in conjunction with their associated word models, is to assign probabilities to strings of words in response to input speech or handwriting signals. Each LE is aided by a Language Model (LM), specifically a handwriting LM 36a and a speech LM 38a, whose role is to reduce the search space by a priori discarding unlikely strings of words or characters. By example, and as was previously noted, the string of words "the phone drinks" has a much smaller likelihood or probability of occurrence than the string "the phone rings". It would thus be inefficient to carry out a full likelihood computation on the former string as opposed to the latter string. The LM may be of a statistical nature, such as one based on N-gram probabilities, or as simple as a machine readable dictionary. Furthermore, the LM for speech may be different than the LM for handwriting. In a presently preferred embodiment of the invention the speech LM 38a is a statistical 3-gram model and the handwriting LM 36a is a dictionary look-up.

After training, and during decoding of on-line speech and/or handwriting, the LEs 36 and 38 receive the feature vectors from blocks 24 and 26, respectively, and, in conjunction with the associated word models, and in some cases the associated LM scores, generate estimations of probable matching words. The speech estimator 38 outputs a list ($L_1$) of word estimations and the handwriting estimator also outputs a list ($L_2$) of word estimations. By example, for handwriting the input strokes are compared to prototypes via elastic matching and identified characters are grouped and compared to a dictionary of valid character sequences to derive the list of probable word candidates ($L_2$). For speech, the likelihood of each Markov word model producing the input utterance is computed, after pruning by the 3-gram LM 38a, and those words resulting in the highest scores are placed on the list of word candidates ($L_1$). In both cases (speech and handwriting), the size of the list is preferably statically set using a predetermined reasonable maximum size, such as 15, or may be set dynamically using a threshold. In the latter case, all words whose likelihoods fall within the selected threshold are maintained on the list, and the other words discarded.

Each likelihood score in $L_1$ and $L_2$ is applied to a scaling block 40 to ensure that they are in a comparable range. This is typically necessary in that speech and handwriting likelihoods are obtained independently. This scaling can be implemented, by example, by normalizing each likelihood score in $L_1$ and $L_2$ by the average likelihood score in $L_2$ and $L_2$, respectively. In accordance with the example provided above for the string "the phone rings" the following list may be produced.

| SCORE | WORD |
|---|---|
| 0.25 | rings |
| 0.1 | drinks |
| 0.03 | shrinks |

The scaled likelihood scores in both $L_1$ and $L_2$ (forming lists $SL_1$ and $SL_2$, respectively) are applied to a Likelihood Merging block (LM) 42. For any $sl_1$ and $sl_2$ corresponding to the same word in $SL_1$ and $SL_2$, respectively, a merged likelihood (l) is computed as:

$$l=f(sl_1, sl_2, \alpha, \beta),$$

where the function f(.) is selected in accordance with the intended application environment. In a presently preferred embodiment f(.) is given by:

$$f(sl_1, sl_2, \alpha, \beta)=(\alpha sl_1+\beta sl_2),$$

where $\alpha+\beta=1$.

Assuming for the following example that $N \neq M$ and the use of dynamic lists during training, then:

list $L_1$   list $L_2$ $l_1^1$     $l_2^1$ $\vdots$    $\vdots$ $l_1^N$     $l_2^M$ Scaling provides the scaled lists $SL_1$ and $SL_2$ as:

List $SL_1$    List $SL_2$ $$sl_1^1 = \frac{l_1^1}{\frac{1}{N}\sum_{i=1}^{N} l_1^i} \quad sl_2^1 = \frac{l_2^1}{\frac{1}{M}\sum_{j=1}^{M} l_2^j}$$

$$sl_1^N = \frac{l_1^N}{\frac{1}{N}\sum_{i=1}^{N} l_1^i} \quad sl_2^M = \frac{l_2^M}{\frac{1}{M}\sum_{j=1}^{N} l_2^j}$$

Assuming that $sl_1^p$ and $sl_2^q$ correspond to some word ($1 \leq p \leq N$, $1 \leq q \leq M$), then the total likelihood for this word is:

$$l=\alpha sl_1^p+\beta sl_2^q,$$

with $$\alpha = \frac{\sum_{j=1}^{M} sl_2^j}{\sum_{i=1}^{N} sl_1^i + \sum_{j=1}^{M} sl_2^j} = \frac{M}{N+M}$$

$$\beta = \frac{\sum_{i=1}^{N} sl_1^i}{\sum_{i=1}^{N} sl_1^i + \sum_{j=1}^{M} sl_2^j} = \frac{N}{N+M}$$

As such, there is also shown above one suitable method for determining the weights 37 during training. In an ideal case, there is one pair ($\alpha$, $\beta$) for each word in the vocabulary.

In the foregoing example, $\alpha$ and $\beta$ may be the weights 37 or some overriding values ($W_{OVR}$) selected by the user.

The output of the LM block 42 is a list (L) of possible words corresponding to the acoustic and/or stroke inputs. The list of words is ordered by probability. In general, the members of the list L are a function of $SL_1$, $SL_2$, and the associated weights $\alpha$ and $\beta$ (W). The list of possible words is applied to a decoder 44 that selects the candidate word having the highest probability. This selected candidate word is considered to be a recognized message and becomes available to use by other applications including the user interface 12. These other applications may include, by example, a word processing program.

It is within the scope of the invention to provide automatic pruning or trimming of the scaled lists $SL_1$ and $SL_2$ such that L contains only those candidate words that are common to both $SL_1$ and $SL_2$. This method of trimming is readily accomplished by inspection. An initial trimming of the two word lists simplifies the task of decoder 42 in that fewer candidate words need be considered for likelihood merging.

As was previously noted it is also within the scope of the invention to provide a manual or automatic weight override ($W_{OVR}$) to the LM block 42. The $W_{OVR}$ enables a user to vary the weights to provide a desired value. This may be accomplished, for example, if the user is inputting speech information that included words considered to be of great difficulty for the speech recognizer to process. The weights associated with these words are manually changed to give greater weight to the handwriting likelihood scores as opposed to the speech likelihood scores. For example, the weight associated with the words selected from the handwriting recognizer may be set to $\beta=1.0$ and the weight associated with the speech selected words set to $\alpha=0$. This is equivalent to disregarding speech input altogether. Such weight override may also be used in an error correction mode where sequential activation of speech and handwriting is desired. For example, a word known to have a number of easily confusable characters could be entered via the speech transducer 22 as opposed to the handwriting transducer 20, as long as $\alpha=1.0$ and $\beta=0$.

Figure 2:
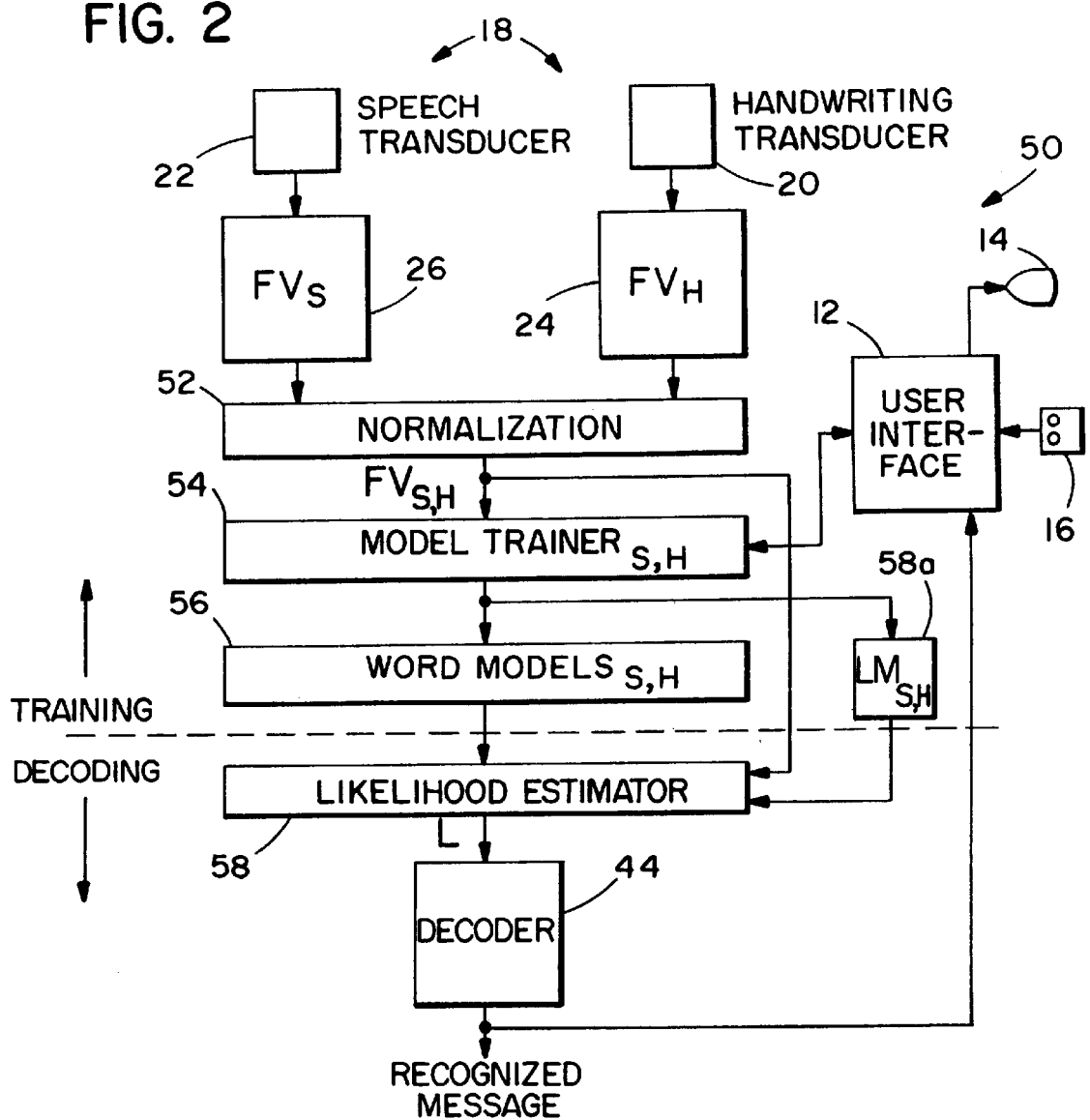
FIG. 2 is a block diagram of a message recognition system that is constructed and operated in accordance with a second embodiment of the invention to include an integrated use of speech and handwriting information.

Referring now to FIG. 2 there is illustrated a second embodiment of a message recognition system 50. In FIG. 2 components that are common with FIG. 1 have the same reference designators and operate in the manner described above.

The embodiment of FIG. 2 operates with a feature vector that is a combination of $FV_S$ and $FV_H$. The speech and handwriting feature vectors are each generated in response to simultaneously provided acoustic and handwriting input. In that the sampling rates and durations of the input are different for the speech and handwriting channels a normalization block 52 normalizes the two inputs to a common time base and combines the normalized feature vectors into a single feature vector. This combination may be a synthetic concatenation of the four dimensional handwriting vector with the 20 dimensional speech vector, as indicated in FIG.

4e, to provide a 24 dimensional combined vector ($FV_{S,H}$). Other techniques may also be employed for combining the two feature vectors. For example, the feature vectors may be combined by taking a product of the two underlying separate vector spaces, thereby providing an 80-dimensional combined feature vector. Other, more complex, combinatorial techniques may also be employed.

It is noted that the above illustrates various examples only, and that other dimensions could be considered. A general consideration is that $dimFV_H < dimFV_S$.

Figure 4F:
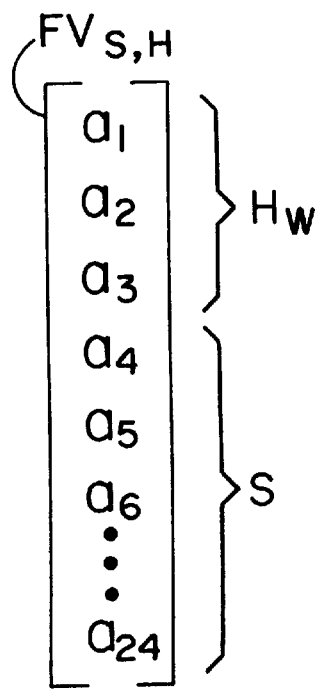
FIG. 4f illustrates another embodiment of a combined feature vector, specifically, a concatenation of the speech feature vector of FIG. 4d with another form of handwriting feature vector that is generated from FIG. 4a by performing a frequency analysis similar to FIG. 4c.

For example, it is within the scope of the invention to treat the input handwritten strokes in the frequency domain, as opposed to a conventional spatial treatment, and to Fourier transform the stroke information. A four or more dimensional stroke feature vector thus represents frequency band amplitude (a) information that is combined with the speech feature vector, as indicated in FIG. 4f. It is pointed out that the frequency domain processing for handwriting may also be employed with the system illustrated in FIG. 1.

In any case, the combined feature vectors are applied during training to a speech and handwriting model trainer processor 54 for training appropriate word models 56. By example, each word model 56 may be a hidden Markov model. It is noted that, due to the combined feature vectors, the states and traversal of the states of the word models 56 will differ from those of the Markov word models employed for only speech, as in FIG. 1. However, once structurally specified, the parameters of these models are trained in a conventional fashion as described, for example, in the above referenced journal article entitled "A Maximum Likelihood Approach to Continuous Speech Recognition", IEEE Transactions on Pattern Analysis and Machine Intelligence, Vol. PAMI-5, No. 2, March 1983 pp. 179–190 by L. Bahl et al. One difference is that, for example, the output distributions in the word models block 56 are joint distributions (i.e., probabilities of joint phoneme/word fragment pairs) reflecting both the speech and handwriting inputs.

The word models 56 are utilized by a Likelihood Estimator (LE) 58 that generates a list (L) of the most probable words based on the combined handwriting and speech input in accordance with a Language Model (LM) 58a. Preferably, for the joint use of speech and handwriting information the LM 58a is based on the 3-gram language model, in that a dictionary look-up model is generally inappropriate for speech processing.

The decoder 44 selects the element of the list having the highest probability and, thus, generates the recognized message.

Figure 5:
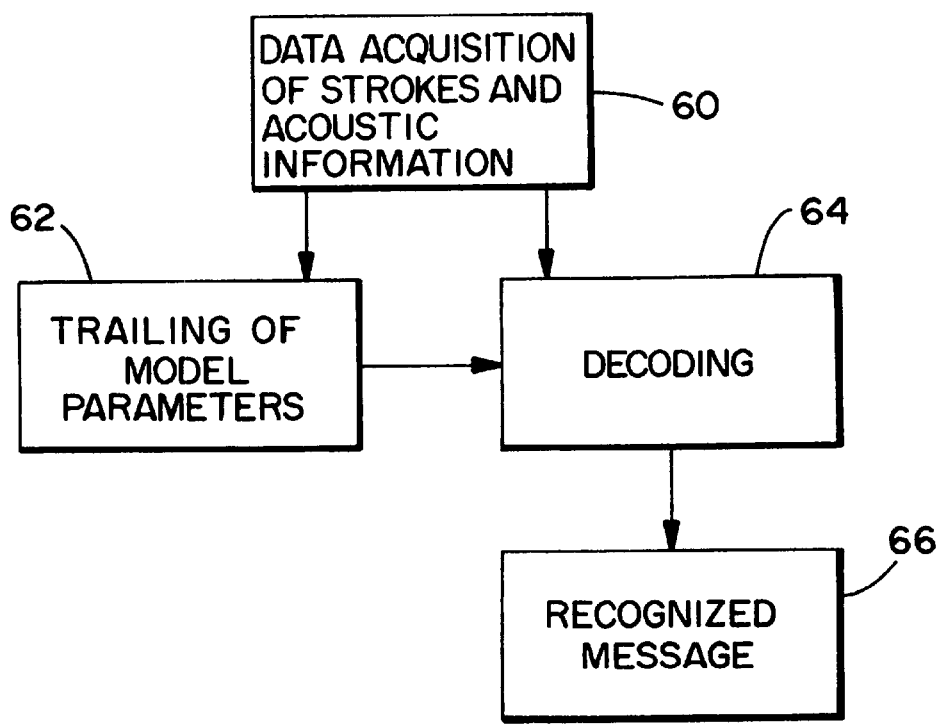
FIG. 5 is a flowchart illustrating the operation of the message recognition system of the invention.

Referring to FIG. 5 there is illustrated in flow chart form the operation of the systems 10 and 50. A generalized discussion of FIG. 5 is first provided followed by a detailed description of the operation of each of the blocks shown therein.

At block 60 there occurs data acquisition of pen strokes and/or acoustic (speech) information. Acquired strokes and acoustic data are operated on by the FV processors 24 and 26, respectively. These two tasks may be performed simultaneously or at different times, depending upon how the handwriting information and the speech information are intended to be integrated.

During a training mode of operation (block 62) the acquired information is analyzed, in reference to a known, training set of handwritten and spoken characters and words, to train the underlying models.

During use, the training block 62 is bypassed and the feature vectors are directed instead to the likelihood estimators (block 64). The likelihood estimators employ the feature vectors to generate candidate words from assemblages of characters and/or phonemes. The decoder selects the most probable word based upon the weights and other relevant parameters.

Recognized messages are thereafter made available for use (block 66). By example, a recognized message may be simply converted to an alphanumeric format and displayed upon the display 14. The recognized message may also be provided to any application that would conventionally receive messages from a keyboard such as, by example, a word processing program.

In accordance with the invention there is provided an integrated use of ASR and AHR. By integrated use it is intended that (a) ASR and AHR are used simultaneously, and a decoding decision is based upon an overall likelihood score, either joint or merged, that an assemblage of characters or phonemes represents a specific word; or that (b) ASR and AHR are used sequentially, but with one being used to correct any errors generated by the other. It should be noted that ASR and AHR need not both be employed by the same user, so long as both process a consistent message. In some applications, it may be desirable to have ASR operate with one user while AHR operates with another.

In regard to the simultaneous use of acoustic and handwriting information it is noted that both contribute to an overall decoding decision. Ambiguous characters in the handwritten information are recognized primarily on the basis of the corresponding spoken utterance and, conversely, the acoustically confusable words are recognized primarily on the basis of the handwriting information. For this technique words are uttered at the same time as they are written and, as a result, natural pauses appear in the spoken utterance. Hence, it is most advantageous to integrate isolated word speech recognition with mixed cursive and discrete handwriting recognition. If, however, the environment is too noisy for this technique it may be more appropriate to replace the traditional ASR by an automatic lip reading recognizer of the type referred to above.

In regard to the sequential use of AHR and ASR, it is noted that AHR may be employed as an enhancement to ASR. For this approach, ASR is considered to be the primary recognition means and AHR is employed primarily as a natural and convenient interface to correct ASR errors that are displayed either on a transparent electronic tablet or on the display terminal 14. This technique is also suitable for entering new words, such as proper nouns, which are not in the ASR vocabulary but present in an AHR dictionary.

Alternatively, ASR may be employed as an enhancement to AHR. For this approach, AHR is considered the primary recognition means and ASR is used for the purpose of correcting AHR errors. By pointing on AHR errors in some pre-defined manner the speech transducer 22 is activated so that the user may pronounce a correct version of the wrongly decoded handwritten word.

For all of the above combinations of AHR and ASR, the integrated use of ASR and AHR has been found to be advantageous for several reasons.

Firstly, there exists complementarity in information. That is, information gathered through speaking and information gathered through handwriting complement one another. For example, the letters U and V are often difficult to recognize using AHR but pose no problem to ASR. Conversely, the so-called "e-set" B, C, D, E, G, P, T, V, Z is notoriously difficult to recognize using ASR but does not constitute as difficult a task for AHR.

Secondly, there is provided complementarity in performance. That is, the manner in which speech and handwriting recognition algorithms operate often complement one another. For example, in AHR the probability of making a word error increases as the length of the word increases, because more characters may be misrecognized. However, in ASR this probability decreases as the length of the word increases, because there are fewer words that are confusable.

Thirdly, there is provided complementarity in functionality. That is, those functions most readily implemented using ASR and AHR complement each other. For example, AHR exhibits editing capabilities which are more difficult to implement using ASR, such as deleting a word by using the writing implement to cross out the word, or indicating that words or paragraphs are to be interchanged. On the other hand some functions, such as generating a large body of text, may be implemented more efficiently with the speech transducer 22 than through the use of the writing transducer 20.

As was previously stated, the integrated use of speech and handwriting recognition results from the Integrated Speech and Writing Interface (ISWI) 18. Word recognition using ISWI may be accomplished under twelve possible conditions, depending on whether speech is isolated or continuous, whether handwriting is discrete or cursive, and whether the two recognition procedures are sequential, merged or joint. In this regard, the sequential use of AHR and ASR may be best employed for error correction, the joint use of AHR and ASR is achieved through the use of joint likelihood estimation, and the merged use of AHR and ASR employs weighted likelihood estimations of the form ($\alpha L_1 + \beta L_2$).

Furthermore, the implementation of ISWI depends on three processes: (a) data acquisition (block 60); (b) training, assuming a user-dependent mode (block 62); and (c) decoding (block 64). These processes are now discussed in greater detail.

Data Acquisition (Block 60)

There are two most prevalent modes of acquiring data for the use of the message recognition systems 10 and 50. In a training mode, except for the joint likelihood mode, a user produces stroke and acoustic information separately by writing and speaking generally different training materials. For example, a user may train ASR on 100 or 200 phonetically balanced sentences, and train AHR on a few sentences comprising several instances of all letters of the alphabet. In a decoding mode, except for the sequential use mode, a user produces stroke and acoustic information simultaneously by writing and speaking the same message. This procedure is especially suitable for cursive writing and isolated speech in that, since writing is slower than speaking, pauses naturally appear between each spoken word.

Training (Block 62)

The training process may be partitioned into two parts. First, suitable feature vectors are generated for both speech and handwriting. Secondly, each feature vector is used in conjunction with some class of models, such as hidden Markov models, and the associated word model parameters are trained accordingly.

If training is done separately for speech and handwriting the selected feature vectors can be those ordinarily used in either domain. This results in the generation of pairs of feature vectors that correspond to the acoustic and stroke information, respectively. Such pairs of feature vectors may be utilized in two distinct ways. A simplest method uses the vectors as in FIG. 1 in two separate classes of models, one for speech and the other for handwriting. The other method, embodied in the system of FIG. 2, normalizes the input data, combines features vectors, and trains extended word models that incorporate both acoustic and stroke information.

As was stated, known methods employed for speech and handwriting recognition to generate and train models, such as hidden Markov models, may be employed for the integration of these two techniques. The use of neural networks as models for speech and handwriting is also within the scope of the invention. These methods, in general, all operate on abstract mathematical objects, such as strings of labels or points in vector spaces. However, in the case of joint training, the underlying model structures, such as word templates or neural network topologies, are different for ISWI than those used for AHR or ASR alone.

The following articles describe suitable embodiments of neural networks for speech recognition: A. Waibel, T. Hanazawa, G. Hinton, K. Shikano, K. Lang, "Phoneme Recognition Using Time-Delay Neural Networks", IEEE Trans. on Acoustic, Speech and Signal Processing, Vol. 37, No. 3, pp. 328–339, March 1989; and S. G. Kong and B. Kosko, "Differential Competitive Learning for Centroid Estimation and Phoneme Recognition", IEEE Trans. Neural Networks, Vol. 2, No. 1, pp. 118–124, January 1991.

The following articles describe suitable embodiments of neural networks for handwriting recognition: P. Morasso, "Neural Models of Cursive Script Handwriting", Proc. 1989 International Joint Conference on Neural Networks, Volume II, pp. 539–542, Washington, D.C., June 1989; and I. Guyon, P. Albrecht, Y. Le Cun, J. Denker, and W. Hubbart, "Design of a Neural Network Character Recognizer for a Touch Terminal", Pattern Recognition, Volume 24, 1991, in press.

Decoding (Block 64)

Just as separate word model training and joint word model training are distinguished, a same methodological dichotomy exists for decoding.

For the case where acoustic and stroke information separately contribute to an overall decoding decision, one suitable general decision making procedure is based on multiple expert opinions, as in consensus theory. For example, the overall likelihood score may be a weighted sum of the likelihood scores corresponding to each source of information, the weights (W) being selected during training on the basis of such external factors as the length of the candidate word or the presence of noise.

The following three journal articles are referenced as teaching decision making strategies suitable for use by the decision decoder 44 in selecting between acoustic and stroke information: "Combining Probability Distributions from Dependent Information Sources", Management Science, Vol. 27, No. 4, April 1981, pages 479–488 (R. L. Winkler); "On the Aggregation of Individual Probability Estimates", Management Science, Vol. 27, No. 8, August 1981, pages 959–964 (R. F. Bordley et al.); and "Consensus and Evidence", Pattern Recognition in Practice II, Elsevier Science Publishers B.V. (North Holland), 1986, pages 523–546 (C. Berenstein et al.)

Alternatively, when both speech and handwriting information simultaneously contribute to the decoding decision, as in the message recognition system 50 of FIG. 2, the decision is made on the basis of the LE 58 operating on the extended word models 56 in accordance with the language model 58a.

ISWI has application in a number of fields, including the field of human factor experiments. More generally, ISWI is well suited in any domain where the complementarity of speech and handwriting information can be exploited, and, in particular, for error-correcting and editing purposes.

EXAMPLE

Two series of experiments were performed. A purpose of the first series was to obtain information regarding the complementarity of speech and handwritten information. A purpose of the second series was to obtain information regarding the complementarity of speech and handwriting recognition performance.

In the first series of experiments a vocabulary of 24 words composed of eight colors, eight objects, and eight prepositions was employed. A subject (not previously familiar with AHR) wrote in writer-independent mode each of the 24 words in a discrete manner. Six words were incorrectly decoded, yielding a handwriting error rate of 25%. The same words were spoken to ASR in an isolated utterance manner and decoded in a speaker-dependent mode. Twelve words were incorrectly decoded, yielding a speech error rate of 50% on this relatively difficult vocabulary. An intersection between the handwriting-ambiguous and speech-ambiguous words was found to reduce to three words, one of which was outside the vocabulary of the speech recognizer. The combination thus yields an overall error rate of only 8%.

It is noted that in the case of AHR all of the errors (such as "ORANGE" decoded as "ORAIVGE") could readily be detected and corrected by automatic reference to an underlying dictionary. This post-processing may be implemented through a simple algorithm which, for a given sequence of characters, determines a word from the given vocabulary that best fits this sequence. The algorithm need only compute the number of matching letters in the input sequence and each tentative word. In the case of ASR, however, it was discovered that this post-processing technique is capable of only limited corrections.

It is also noted that there occurred an improvement of handwriting recognition with time. After observing the errors produced during the first trial the subject was able to obtain an improved accuracy during a second trial. A similar improvement, although more limited, was observed when using ASR.

In the second series of experiments, another subject produced the sentence "Two articles did not describe speech perception by eye and ear" in three different ways: (a) by writing the sentence on AHR in writer-dependent, run-on mode; (b) by speaking the sentence to ASR in speaker-dependent, isolated utterance mode; and (c) by writing short words (two, did, not, by, eye, and, ear) on AHR and speaking long words (articles, describe, speech, perception) to ASR in the same conditions as in (a) and (b), respectively. Condition (a) produced two errors, both of them made on long words ("articles" and "perception"). Condition (b) produced four errors, three on short words ("two, by, eye") and one on the long word "articles". However, condition (c) produced only one error on the long word "articles", which was misrecognized by ASR.

These experiments provide explicit evidence that the use of two sources of information, specifically handwriting and speech, greatly enhances the word recognition process.

The teaching of the invention may be employed to provide a superior "human factor workbench" that addresses the problems noted above in regard to human factors experimental techniques. Within the controlled environments typical of all psychological experiments the invention is amenable to several implementations. For example, for short experiments involving many different users (for which training would be justifiable), ISWI provides for a writer/speaker-independent system relying for overall accuracy on the constraints imposed on vocabularies and grammars. For long experiments involving the same set of subjects over a sustained period of time, ISWI provides a writer/speaker-dependent system with capabilities of connected speech and/or cursive writing recognition in order to enhance the naturalness of the interface.

While the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A message recognition system comprising:
   a first transducer for converting a user's speech to a first signal;
   a second transducer for converting the user's handwriting to a second signal; and
   a data processor, having a first input coupled to the first signal and a second input coupled to the second signal, for processing the first signal and the second signal to identify an informational content of the first signal and the second signal, said data processor including,
      a first likelihood estimator for generating a first list comprised of one or more probable messages conveyed by the informational content of the first signal;
      a second likelihood estimator for generating a second list comprised of one or more probable messages conveyed by the information content of the second signal;
   wherein a probable message is comprised of at least one word;
      a likelihood merger for selectively merging the first list and the second list to form a third list;
      a decoder for selecting from the third list a most probable one of the probable messages to be an output message; and
      means for outputting the output message.

2. A system as set forth in claim 1 wherein the first transducer includes a microphone coupled to means for converting an output of the microphone to a digital signal, and wherein the second transducer includes an electronic tablet having means for converting strokes, made by a writing implement, into digital data expressive of a motion of the writing implement.

3. A system as set forth in claim 1 wherein the first transducer includes means for imaging at least the user's mouth during speech, and wherein the second transducer includes an electronic tablet having means for converting strokes, made by a writing implement, into digital data expressive of a motion of the writing implement.

4. A system as set forth in claim 1 wherein the data processor includes first means for transforming the first signal into a plurality of first multi-dimensional vectors and second means for transforming the second signal into a plurality of second multi-dimensional vectors.

5. A system as set forth in claim 4 wherein said data processor further includes:
   means, responsive to the plurality of first multi-dimensional vectors that result from the operation of the first transforming means, for training a first set of word models to generate one or more candidate words in response to a spoken word; and
   means, responsive to the plurality of second multi-dimensional vectors that result from the operation of the second transforming means, for training a second set of word models to generate one or more candidate words in response to a written word.

6. A system as set forth in claim 5 wherein the first set of word models is comprised of hidden Markov word models.

7. A system as set forth in claim 5 wherein the first set of word models is comprised of neural network means.

8. A system as set forth in claim 5 wherein the second set of word models includes character prototypes comprised of stroke templates generated by an elastic stroke matching means.

9. A system as set forth in claim 6 wherein said likelihood merger includes means, responsive to a first list of candidate words obtained by computation on the first set of word models in response to the first signal, and responsive to a second list of candidate words obtained by computation on the second set of word models in response to the second signal, for generating a third, merged list of candidate words.

10. A system as set forth in claim 9 wherein said decoder includes means, responsive to the generated third list, for selecting from the third list a candidate word that has a highest probability of representing all or a part of the probable message, and for outputting the selected candidate word as an output word.

11. A system as set forth in claim 9 wherein the generating means includes means for scaling, if required, probabilities associated with candidate words from the first list relative to probabilities associated with candidate words from the second list.

12. A system as set forth in claim 1 wherein said likelihood merger is responsive to predetermined weighting factors for merging the first list of probable messages and the second list of probable messages.

13. A message recognition system comprising:
a first transducer for converting a user's speech to a first signal;
a second transducer operating in parallel with said first transducer for converting the user's handwriting to a second signal;
a signal combiner, having a first input coupled to the first signal and a second input coupled to the second signal, for combining the first signal and the second signal to generate a third signal;
a likelihood estimator having an input coupled to said third signal for generating a list comprised of one or more probable messages conveyed by the informational content of the third signal, wherein a probable message is comprised of at least one word; and
a decoder for selecting from the list a most probable one of the probable messages to be an output message.

14. A system as set forth in claim 13 wherein the signal combiner includes:
first means for transforming the first signal into a plurality of first multi-dimensional vectors;
second means for transforming the second signal into a plurality of second multi-dimensional vectors; and
means for combining individual ones of the plurality of first multi-dimensional vectors and individual ones of the plurality of second multi-dimensional vectors to form a plurality of third multi-dimensional vectors.

15. A system as set forth in claim 14 wherein the signal combiner includes means, responsive to the plurality of third multi-dimensional vectors that result from the operation of the combining means, for training a single set of word models to generate one or more candidate words in response to a written word and also in response to a spoken word that corresponds to the written word.

16. A system as set forth in claim 15 wherein the single set of word models is comprised of hidden Markov word models.

17. A system as set forth in claim 15 wherein the single set of word models is comprised of a neural network means.

18. A system as set forth in claim 15 wherein said decoder is responsive to a list of candidate words obtained by computation on the single set of word models, for selecting a candidate word from the list that has a highest probability of representing all or a part of the probable message, and for outputting the selected candidate word.

19. A system as set forth in claim 13 wherein said signal combiner includes means for normalizing, to a common time base, the first signal with respect to the second signal.

20. A method for operating a message recognition system, comprising the steps of:
operating a first transducer for converting a user's speech to a first signal;
operating a second transducer for converting the user's handwriting to a second signal; and
operating a digital data processor for processing the first signal and the second signal to identify an informational content of a consistent message that is conveyed separately by the first signal and by the second signal or that is conveyed jointly by the first signal and by the second signal, the step of processing including the steps of,
operating at least one likelihood estimator for generating one or more probable messages conveyed by the informational content of both the first signal and the second signal, wherein a probable message is comprised of at least one word; and
operating a decoder for selecting a most probable one of the probable messages to be an output message, wherein the step of operating a decoder includes a step of considering a first weighting value, that is associated with the first signal, and a second weighting value, that is associated with the second signal.

21. A method as set forth in claim 20 wherein the step of operating a first transducer for converting a user's speech includes a step of converting an output of a microphone to a digital signal, and wherein the step of operating a second transducer for converting a user's handwriting includes a step of converting strokes, made by a writing implement, into digital data expressive of a motion of the writing implement.

22. A method as set forth in claim 20 wherein the step of operating a first transducer for converting a user's speech includes a step of imaging at least the user's mouth during speech, and wherein the step of operating a second transducer for converting a user's handwriting includes a step of converting strokes, made by a writing implement, into digital data expressive of a motion of the writing implement.

23. A method as set forth in claim 20 wherein the step of processing includes a step of operating the digital data processor to transform the first signal into a plurality of first multi-dimensional vectors and to transform the second signal into a plurality of second multi-dimensional vectors.

24. A method as set forth in claim 23 and further including a step of employing the plurality of first multi-dimensional vectors for training a first set of word models to generate one or more candidate words in response to a spoken word; and a step of employing the plurality of second multi-dimensional vectors for training a second set of word models to generate one or mode candidate words in response to a written word.

25. A method as set forth in claim 24 wherein the step of training a first set of word models includes a step of training a set of hidden Markov word models.

26. A method as set forth in claim 24 wherein the step of training a first set of word models includes a step of training a neural network.

27. A method as set forth in claim 24 wherein the step of training a second set of word models includes a step of converting input strokes into stroke templates through the use of an elastic stroke matching technique.

28. A method as set forth in claim 24 wherein the step of training a first set of word models includes a step of training a first set of language model probabilities, and wherein the step of training a second set of word models includes a step of training a second set of language model probabilities.

29. A method as set forth in claim 24 and, in response to a first list of candidate words obtained by computation on the first set of word models, and in response to a second list of candidate words obtained by computation on the second set of word models, the method further includes a step of operating a likelihood merger for generating a third list of candidate words by merging candidate words from the first and the second lists.

30. A method as set forth in claim 29 and further including a step of operating the decoder for selecting a word from the third, combined list of candidate words, the selected word having a highest probability of representing all or a part of the message.

31. A method of operating a message recognition system, comprising the steps of:

operating a first transducer for converting a user's speech to a first signal;

operating a second transducer for converting, in parallel with the step of converting a user's speech, the user's handwriting to a second signal;

combining with a digital data processor the first signal and the second signal to generate a third signal;

operating a likelihood estimator for generating a list comprised of one or more probable messages conveyed by the informational content of the third signal, wherein a probable message is comprised of at least one word; and operating a decoder for selecting from the list a most probable one of the probable messages to be an output message.

32. A method as set forth in claim 31 wherein the step of operating a first transducer for converting a user's speech includes a step of converting an output of a microphone to a digital signal, and wherein the step of operating a second transducer for converting a user's handwriting includes a step of converting strokes, made by a writing implement, into digital data expressive of a motion of the writing implement.

33. A method as set forth in claim 31 wherein the step of operating a first transducer for converting a user's speech includes a step of imaging at least the user's mouth during speech, and wherein the step of operating a second transducer for converting a user's handwriting includes a step of converting strokes, made by a writing implement, into digital data expressive of a motion of the writing implement.

34. A method as set forth in claim 31 wherein the step of operating a first transducer for converting the user's speech includes a step of transforming the first signal into a plurality of first multi-dimensional vectors, and wherein the step of operating a second transducer for converting the user's handwriting includes a step of transforming the second signal into a plurality of second multi-dimensional vectors.

35. A method as set forth in claim 34 and further including a step of combining the plurality of first multi-dimensional vectors and the plurality of second multi-dimensional vectors to form a plurality of third multi-dimensional vectors.

36. A method as set forth in claim 35 wherein the step of combining includes a further step of using the plurality of third multi-dimensional vectors to train a single set of word models to generate one or more candidate words in response to a simultaneous occurrence of a written word and a corresponding spoken word.

37. A method as set forth in claim 36 wherein the step of training a single set of word models includes a step of training a set of hidden Markov language models.

38. A method as set forth in claim 36 wherein the step of training a single set of word models includes a step of training a single set of language model probabilities.

39. A method as set forth in claim 36 wherein the step of training a single set of word models includes a step of training a neural network.

40. A method as set forth in claim 36 and, in response to a list of candidate words obtained by computation on the single set of word models, further includes a step of operating the decoder for selecting a word from the list, the selected word having a highest probability of representing all or a part of the message.

41. A method as set forth in claim 31 wherein the step of combining includes an initial step of normalizing, to a common time base, the first signal with respect to the second signal.

42. A message recognition system that includes a digital data processor, said digital data processor comprising:

a user interface having a first input coupled to an output of a speech transducer means and a second input coupled to an output of a handwriting transducer means, for receiving signals therefrom and for converting the signals to a first multi-dimensional representation of a speech signal and to a second multi-dimensional representation of a handwriting signal;

a first likelihood estimator, having an input coupled to said first multi-dimensional representation of the speech signal, for generating, in accordance with an associated first word model and in response to the first multi-dimensional representation, a first list comprised of one or more probable words that the first multi-dimensional representation may represent;

a second likelihood estimator, having an input coupled to said second multi-dimensional representation of the handwriting signal, for generating, in accordance with an associated second word model and in response to the second multi-dimensional representation, a second list comprised of one or more probable words that the second multi-dimensional representation may represent;

a likelihood merger, having an input coupled to an output of said first generating means and to an output of said second generating means, for selectively merging said first list and said second list into a third list comprised of probable words; and a decoder that is responsive to the probable words of said third list, for selecting a most probable word as an output word.

43. A system as set forth in claim 42 wherein said first likelihood estimator further has an input coupled to an output of a first language model, said first likelihood estimator being responsive to said first language model for eliminating probable words from said first list that are incompatible with said first language model, and wherein said second likelihood estimator further has an input coupled to an output of a second language model, said second likelihood estimator being responsive to said second language model for eliminating probable words from said second list that are incompatible with said second language model.

44. A message recognition system that includes a digital data processor, said digital data processor comprising:

a user interface having a first input coupled to an output of a speech transducer means and a second input coupled to an output of a handwriting transducer means, for simultaneously receiving a speech signal from the speech transducer and a handwriting signal from the handwriting transducer and for converting the speech signal to a first multi-dimensional representation and for converting the handwriting signal to a second multi-dimensional representation;

a combiner for combining the first and the second multi-dimensional representations into a third multi-dimensional representation that is a combination of both the speech signal and the handwriting signal;

a likelihood estimator having an input coupled to said third multi-dimensional representation, for generating, in accordance with an associated word model and in response to the third multi-dimensional representation, a list comprised of one or more probable words that the third multi-dimensional representation may represent; and a decoder that is responsive to the probable words of said list, for selecting a most probable word as an output word.

45. A system as set forth in claim 44 wherein said likelihood estimator further has an input coupled to an output of a language model, said likelihood estimator being responsive to said language model for eliminating probable words from said list that are incompatible with said language model.

46. A message recognition system that includes a digital data processor, said digital data processor comprising:

a first user interface having an input coupled to an output of a speech transducer means, for converting an output thereof to a multi-dimensional representation of a speech signal;

a second user interface having an input coupled to an output of a handwriting transducer means, for converting an output thereof to a multi-dimensional representation of a handwriting signal;

a first likelihood estimator that is responsive to said multi-dimensional representation of the speech signal, for generating, in accordance with an associated first word model, a first list comprised of one or more probable words that the multi-dimensional representation of the speech signal may represent, said first likelihood estimator having an input coupled to an output of a first language model, said first likelihood estimator being responsive to said first language model for eliminating probable words from said first list that are incompatible with said first language model;

a second likelihood estimator that is responsive to said multi-dimensional representation of the handwriting signal, for generating, in accordance with an associated second word model, a second list comprised of one or more probable words that the multi-dimensional representation of the handwriting signal may represent, said second likelihood estimator having an input coupled to an output of a second language model, said second likelihood estimator being responsive to said second language model for eliminating probable words from said second list that are incompatible with said second language model;

a likelihood combiner having an input coupled to an output of said first likelihood estimator and to an output of said second likelihood estimator for selectively merging said first list and said second list into a third list comprised of probable words, said likelihood estimator being responsive to a set of predetermined weights; and a decoder that is responsive to said third list, for selecting a most probable word as an output word.

* * * * *